(No Model.)

F. DOUGLAS.
PNEUMATIC TIRE FOR BICYCLES.

No. 551,533. Patented Dec. 17, 1895.

Witnesses:

Inventor:
Frank Douglas

UNITED STATES PATENT OFFICE.

FRANK DOUGLAS, OF CHICAGO, ILLINOIS.

PNEUMATIC TIRE FOR BICYCLES.

SPECIFICATION forming part of Letters Patent No. 551,533, dated December 17, 1895.

Application filed December 31, 1894. Serial No. 533,471. (No model.)

*To all whom it may concern:*

Be it known that I, FRANK DOUGLAS, a citizen of the United States, residing at Chicago, county of Cook, State of Illinois, have invented certain new and useful Improvements in Pneumatic Tires for Bicycles, of which the following is a specification of the various modifications.

This invention relates to a tire with an inner inflatable tube to which a valve is attached and an outer casing, composed of cloth and rubber, which surrounds and protects the inner tube, so as to maintain the proper pressure for riding purposes. The outer casing is so constructed in the various modifications that it can be opened all around its inner circumference where it enters the rim for the purpose of putting in or repairing the inner tube or for repairing the casing from its inner surface.

The casing is provided with projecting ears or lugs on either side of the opening which project down into a single recess in the center of the rim. These projecting lugs serve the double purpose of guides to hold the tire true on the rim and also hold it in place without the use of cement of any kind. They also assist to prevent the casing from spreading or opening when the inner tube is inflated.

In order to make the casing doubly safe and to protect the rim from the pressure on the lugs by inflation, I also provide fastenings in addition to the projecting lugs which enter the recess of the rim, which additional fastening enables me to inflate the tire to a riding-pressure if desired before it is inserted in the rim, thereby making the fastening of the inner circumferential opening of the casing doubly safe from separation or from blowing out of the rim.

The accompanying drawings illustrate the various methods and modifications for attaching the inner circumferential edges of the casing together after the insertion of the inner tube, and illustrates the ease with which they can be detached or opened up to get at the inner tube.

Figure 1:
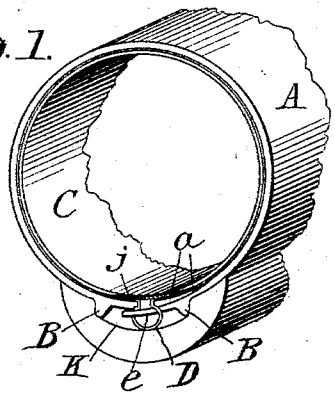
Figure 4:
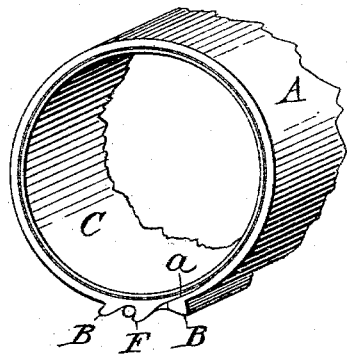
Figure 2:
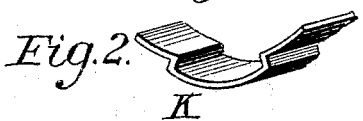
Figure 5:
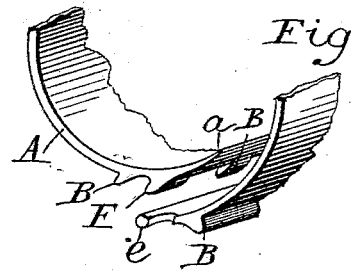
Figure 3:
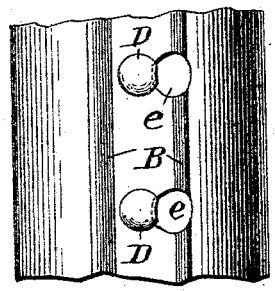
Figure 6:
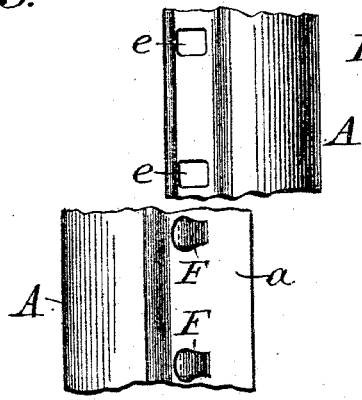
Figure 8:
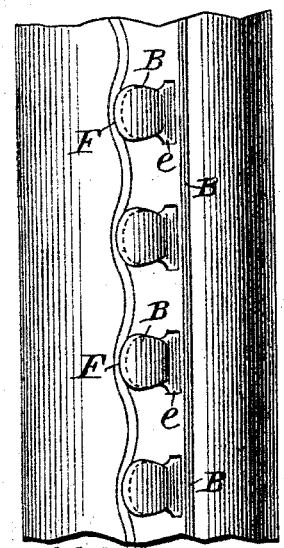
Figure 7:
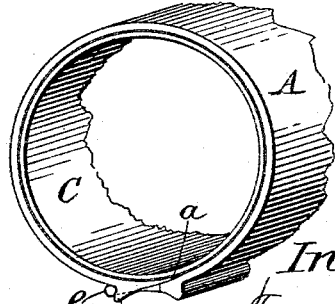

Figure 1 is a view of a cross-section of the tire cut through at right angles on a radial line from the center of the wheel-hub, and shows the casing buttoned together by metallic buttons resting in position on a cross-section of a wood rim, also showing the projecting lugs down in the recess around the center of the rim. The side of the casing upon which the buttons are attached laps inside of the part that has the buttonholes upon it and covers the openings of the buttonholes. Fig. 2 shows a metallic rim with a single recess in its center to receive the lugs of the tire, the same as shown in the wood rim, Fig. 1. Fig. 3 shows a section of the casing broken off at either end, presenting to view the inner circumferential portion of the tire with lugs, buttons, and buttonholes which rest in the recess of the rim when ready for inflation. Fig. 4 is another cross-section of the tire with lugs same as Fig. 1. On one side between the lugs are a series of buttons or hooks formed of the material composing the casing, which material is forced into the mold which is shaped to receive and form the buttons. On the other side of the opening is a corresponding row of buttonholes, and when buttoned together assumes the same position in the rim as shown in Fig. 1. Fig. 5 shows two sections of the same casing on which the lugs and the buttons are formed separated from the other side of the buttonhole portion. Fig. 6 shows the under side of two sections of the same pieces, Fig. 5 showing the lugs on one and the buttonholes that are made to button over the buttons on the other. Fig. 7 is another modification showing a cross-section of the tire with lugs to fit in the rim similar to Fig. 1. In this modification the projecting lugs on one side are made to form a number of short lugs in the form of buttons, over which a corresponding number of loops are formed by holes cut or formed near the edge of the other overlapping side. A cord or wire molded in the edge of the buttonhole side may be used to increase its strength. When buttoned together it assumes the same position in the rim as in Fig. 1. Fig. 8 is a portion of the same tire, showing the buttons on one side and the buttonholes or laps on the other buttoned or locked together in position to enter the rim, as shown in Fig. 1.

K is a recess in the rim to receive the lugs B B and the button-fastening of the casing, as shown in Figs. 1 and 2.

The object of my invention is to provide and place upon the market a pneumatic tire that can be used satisfactorily in a wood rim of a bicycle without the use of cement to hold it in place, and also to so construct a tire as to make one edge of the casing attach to the other edge so as to form a continuous circular tube before it is attached or placed in the rim, and also to so fasten one edge of the opening to the other that it will sustain the inflation of the inner tube, and thereby take the inflating strain largely off the lugs where they project into the recess of the rim, and also to so attach the edges of the casing that they may be deflated and unbuttoned or opened up at will to get at any part of the inner tube or the inner portions of the casing. In some of the modifications buttons F are used and riveted to the casing, and in others the buttons are formed of the fabric or material composing the casing.

Like letters of reference refer to like parts of the several figures and modifications.

A represents the outer casing.

B B are the projecting lugs that fit down into the single recess of the rim.

C is the inner inflatable tube to which the inflating-valve is attached.

D are metallic buttons attached to the casing a short distance apart all around the inner lapping edge A, and placed inside of and near lug B.

E are buttonholes on the outward lapping edge of the casing, as shown in the various modifications, which can be buttoned or unbuttoned to get at the inner tube without delay or annoyance.

I am aware that a clincher form of tire has been used in both metallic and wood rims, where the great force of the tire's inflation acts with its whole power as a separating strain upon the lugs and the rim with such force as to make it necessary to build a rim of wood of larger size than is practicable to withstand the strain and prevent them from splitting open. I therefore use the lugs more for a true guide to the casing to hold it in place and save cementing than for the purpose of preventing the edges of the casing from separating under pressure.

I am also aware that an attempt has been made to fasten the edges of the casing together by continuous projections on one side to overlap the other, but without the use of buttons or hooks which button through or hook over or through the other side or the guiding lugs to hold the tire true in the rim. Therefore it was found that the lap portion would not stay in place when under pressure and would blow out of the rim.

I am also aware that the laced tire-casings have been made without guiding-lugs to hold them in place, and therefore had to be cemented to the rim, the same as a continuous tube-tire without lugs.

In my invention I guide and hold the tire-casing in its place in the rim by lugs which expand to fit the recess and take a portion of the strain of inflation and bind the tire so tightly in the rim as to prevent creeping or rolling, and therefore no cement is required.

In my device the edges of the casing are fastened together by lapping one side over the other and buttoning the buttons of one side through the buttonholes or loops of the other; or by hooks attached to or hooked into one side and hooked through over a projection or lug, or the lapped edge on the other side; or by dovetailing the fabric, stiffened at its edges, into the fabric of the other stiffened edge. The fabric may be folded over a cord or wire at one or both edges, and by cutting away a portion of the fabric button the cord or wire over the projections or buttons on the other side.

The principal object of my invention is to make a tire-casing in such a manner as to easily lock it together or unlock it, and so constructed that the inflation of the tire will not spread or split the wood rim of a wheel.

The buttons, as shown in Figs. 1 and 3, may be of any material or shape, or in hook form, but are preferably what are known as "eyelet-buttons" D, and are riveted a short distance apart to the inner lapping portion of the casing A, quite near the lug D. Holes corresponding to the buttons on the other and outer lapping edge are made large enough to button through, and when so buttoned the lugs D D are the right distance apart to fit in the recess of the rim K.

I prefer the modification as shown in Figs. 4 or 8, where the buttons or lugs are formed of the material of the casing, and pressed into its shape in the mold which forms the casing, as shown at F, Figs. 4, 5, 6, 7, and 8. The buttons F, Figs. 4 and 5, are independent of the lugs B B. The buttons F, Figs. 7 and 8, are a series of short lugs or buttons formed of the fabric or material of the casing on the inner lapping side, while the outer lapping side has a folded thick or corded edge and is cut away inside of or between the corded edge and the lug in the shape of openings or button-holes corresponding in size to the buttons or lugs on the other side. When buttoned together and inflated, it will fit the recess of the rim by the buttons E on one side and lug B on the other, the same as shown in Fig. 1.

I do not claim metallic hooks or pins attached to one side of a casing and hooked into or passing through the other side, as such hooks and pins have been used before; neither do I claim continuous beads or grooves around the edges of a tire-casing, as such continuous beads and grooves have been used before; neither do I claim the dovetailing of metallic rims, but confine myself to tire-casings composed of cloth and rubber.

Having thus described the nature and object of my invention, what I claim as new, and desire to secure by Letters Patent, is—

1. A bicycle tire with an inflatable tube, protected by an endless outer casing of cloth and rubber, its inner circumferential edges lapping each other, having near the edge and on one side of the opening a series of hook-shaped projections or buttons adapted to button into button-holes corresponding to them on the other side, a series of buttons and button-holes lying between or forming a part of the two projecting beads or lugs B B, which are molded of and form a part of the tire casing, the lugs B B serving to hold the tire in the recess of a wheel rim without the aid of cement, as and for the purpose set forth.

2. A bicycle tire with an inner inflatable tube, protected by an endless outer casing of cloth and rubber, with its inner circumferential edges lapping each other, one edge of the casing having a projecting continuous bead, molded of the material of the casing, a short distance back from its edge and a series of projecting hook shaped buttons molded and formed of the material of the casing, between the continuous bead and its edge, with a continuous corresponding bead on the other side of the casing and a series of holes near its edge to engage or hook over the projecting buttons when as and for the purpose set forth.

3. An endless bicycle tire casing, composed of cloth and rubber, with its inner circumferential edges lapping each other when one side is molded with a series of hook shaped buttons of the material composing the casing a short distance from the edge and with a bead or projection a short distance from the edge of the other side and with its edge folded over an inserted cord or wire, between this corded edge and the bead a series of openings or button-holes corresponding to the buttons of the other side to hook over the buttons of the opposite side, when as and for the purpose set forth.

FRANK DOUGLAS.

Witnesses:
C. A. PATTERSON,
A. W. PARKHURST.